United States Patent
Kanamarlapudi et al.

(10) Patent No.: US 9,473,416 B2
(45) Date of Patent: Oct. 18, 2016

(54) ENHANCED TECHNIQUES OF TCP ACK TRANSMISSION IN UPLINK

(71) Applicant: QUALCOMM Incorporated, San Diego, CA (US)

(72) Inventors: Sitaramanjaneyulu Kanamarlapudi, San Diego, CA (US); Nela Gurevich, Yoqneam Illit (IL); Venkata Ramanan Venkatachalam Jayaraman, San Diego, CA (US); Valeriya Perelman, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 73 days.

(21) Appl. No.: 14/463,223

(22) Filed: Aug. 19, 2014

(65) Prior Publication Data

US 2015/0215218 A1 Jul. 30, 2015

Related U.S. Application Data

(60) Provisional application No. 61/933,694, filed on Jan. 30, 2014.

(51) Int. Cl.
*H04L 12/855* (2013.01)
*H04L 29/06* (2006.01)
*H04W 80/06* (2009.01)
(Continued)

(52) U.S. Cl.
CPC ........... *H04L 47/2466* (2013.01); *H04L 69/16* (2013.01); *H04W 80/06* (2013.01); *H04L 47/14* (2013.01); *H04L 47/193* (2013.01); *H04L 47/323* (2013.01)

(58) Field of Classification Search
CPC . H04L 47/2466; H04L 47/14; H04L 47/323; H04L 47/193; H04L 69/16; H04W 47/2466; H04W 47/14; H04W 47/323; H04W 80/067; H04W 80/06

See application file for complete search history.

(56) References Cited

U.S. PATENT DOCUMENTS

| | | | |
|---|---|---|---|
| 2007/0030819 A1* | 2/2007 | Bichot | H04L 29/06027 370/315 |
| 2008/0080464 A1* | 4/2008 | Speight | H04L 1/1854 370/342 |
| 2008/0095099 A1 | 4/2008 | Kesselman et al. | |

(Continued)

FOREIGN PATENT DOCUMENTS

| EP | 1 868 330 A1 | 12/2007 |
|---|---|---|
| EP | 2 632 102 A1 | 8/2013 |

OTHER PUBLICATIONS

IETF RFC 792, Sep. 1981, p. 10.*

(Continued)

*Primary Examiner* — Jianye Wu
(74) *Attorney, Agent, or Firm* — Arent Fox LLP

(57) ABSTRACT

Techniques of Transmission Control Protocol (TCP) packet transmission for wireless communication are provided for a user equipment (UE). The UE receives a plurality of TCP packets on a downlink channel from a network. In response, the UE generates a plurality of TCP Acknowledgment (ACK) packets corresponding to the plurality of received TCP packets. The plurality of TCP ACK packets is prioritized based on certain criteria. A TCK ACK packet with a highest priority among the plurality of TCP ACK packets is selected. The selected highest priority TCP ACK packet is then sent to the network on an uplink channel.

30 Claims, 7 Drawing Sheets

(51) Int. Cl.
*H04L 12/801* (2013.01)
*H04L 12/823* (2013.01)

(56) References Cited

U.S. PATENT DOCUMENTS

2009/0232017 A1  9/2009  Carlisle

2013/0272121 A1* 10/2013  Stanwood ............ H04L 47/2475
                                                              370/230

OTHER PUBLICATIONS

IETF RFC 1122, Oct. 1981, p. 82.*
International Search Report and Written Opinion—PCT/US2015/012980—ISA/EPO—Jun. 5, 2015 (11 pages).

* cited by examiner

ENHANCED TECHNIQUES OF TCP ACK TRANSMISSION IN UPLINK

CLAIM OF PRIORITY UNDER 35 U.S.C. §119

This present application for patent claims priority to U.S. Provisional Application No. 61/933,694, entitled "ENHANCED TECHNIQUES OF TCP ACK TRANSMISSION IN UPLINK," filed on Jan. 30, 2014, and assigned to the assignee hereof and hereby expressly incorporated by reference herein.

BACKGROUND

Aspects of the present disclosure relate generally to wireless communication systems, and more particularly, to techniques for transmitting Transmission Control Protocol (TCP) acknowledgement (ACK) packets on an uplink channel from a user equipment to a network.

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

SUMMARY

Enhanced techniques of Transmission Control Protocol (TCP) packet transmission for wireless communication are provided for a user equipment (UE). The UE receives a plurality of TCP packets on a downlink channel from a network. In response, the UE generates a plurality of TCP Acknowledgment (ACK) packets each corresponding to each of the plurality of received TCP packets. The plurality of TCP ACK packets is then prioritized and a TCK ACK packet with a highest priority is selected among the plurality of TCP ACK packets. The prioritization of the plurality of TCP ACK packets may be based on either acknowledgment numbers associated with the plurality of TCP ACK packets or TCP flows associated with the plurality of TCP ACK packets. The selected highest priority TCP ACK packet is then sent to the network on an uplink channel.

In one aspect, the present disclosure provides a method of wireless communication for a user equipment. A plurality of TCP packets is received by the UE on a downlink channel from a network. The UE generates a plurality of TCP ACK packets each corresponding to each of the plurality of received TCP packets. The plurality of TCP ACK packets is prioritized for transmission on an uplink channel. The prioritization of the plurality of TCP ACK packets may be based on either acknowledgment numbers associated with the plurality of TCP ACK packets or TCP flows associated with the plurality of TCP ACK packets. Among the plurality of TCP ACK packets, the highest priority TCP ACK packet is determined and transmitted to the network on the uplink channel.

Another aspect of the present disclosure provides an apparatus for wireless communications. The apparatus includes means for or a component configured to receive a plurality of TCP packets on a downlink channel from a network. The apparatus further includes means for or a component configured to generate a plurality of TCP ACK packets each corresponding to each of the plurality of received TCP packets. The apparatus further includes means for or a component configured to prioritize the plurality of TCP ACK packets for transmission on an uplink channel. The prioritization of the plurality of TCP ACK packets may be based on either acknowledgment numbers associated with the plurality of TCP ACK packets or TCP flows associated with the plurality of TCP ACK packets. The apparatus further includes means for or a component configured to select a TCP ACK packet having a highest priority among the plurality of TCP ACK packets. The apparatus further includes means for or a component configured to transmit the highest priority TCP ACK packet on the uplink channel to the network.

Still another aspect of the present disclosure provides a TCP transmission component of a user equipment for wireless communication. The TCP transmission component includes a receiving TCP packet component, a generating TCP packets component, a prioritizing TCP packets component, a selecting TCP packet component, and a transmitting TCP packet component. The receiving TCP packets component is configured to receive a plurality of TCP packets on a downlink channel from a network. The generating TCP packets component is configured to generate a plurality of TCP ACK packets each corresponding to each of the plurality of received TCP packets. The prioritizing TCP packets component is configured to prioritize the plurality of TCP ACK packets for transmission on an uplink channel. The prioritization of the plurality of TCP ACK packets may be based on either acknowledgment numbers associated with the plurality of TCP ACK packets or TCP flows associated with the plurality of TCP ACK packets. The selecting TCP packet component is configured to select a TCP ACK packet having a highest priority among the plurality of TCP ACK packets. The transmitting TCP packet component is configured to transmit to the network the selected highest priority TCP ACK packet on the uplink channel.

Another aspect of the present disclosure provides a computer readable medium comprising computer executable code for wireless communications of a user equipment. The computer readable medium includes code for receiving a plurality of TCP packets on a downlink channel from a network. The computer readable medium further includes code for generating a plurality of TCP ACK packets each corresponding to each of the plurality of received TCP packets. The computer readable medium further includes code for prioritizing the plurality of TCP ACK packets for transmission on an uplink channel. The prioritization of the plurality of TCP ACK packets may be based on either acknowledgment numbers associated with the plurality of TCP ACK packets or TCP flows associated with the plurality of TCP ACK packets. The computer readable medium further includes code for selecting a TCP ACK packet having a highest priority among the plurality of TCP ACK packets. The computer readable medium further includes code for transmitting the highest priority TCP ACK packet on the uplink channel to the network.

These and other aspects of the invention will become more fully understood upon a review of the detailed description, which follows.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In wireless networks, timely transmission of Transmission Control Protocol (TCP) Acknowledgement (ACK) packets on an uplink channel (from a user equipment to a network) is important for maintaining smooth flows of downlink data. If there is any delay in transmission of a TCP ACK packet, the delay will impact the transmission of downlink data, for example, due to proprietary window based transmission mechanisms on the downlink channel from the network to the user equipment.

According to the present disclosure, a user equipment (UE) receives a plurality of TCP packets on a downlink channel from a network. In response to the received TCP packets, the UE generates a plurality of TCP ACK packets for transmission on a uplink channel to the network. The plurality of generated TCP ACK packets are prioritized based on certain criteria for transmission on the uplink channel, which may or may not be resource limited. The prioritization of the plurality of TCP ACK packets may be based on acknowledgment numbers associated with the plurality of TCP ACK packets, TCP flows associated with the plurality of TCP ACK packets, type of service (TOS) information, etc. Among the plurality of TCP ACK packets, a TCP ACK packet having a highest priority is selected and transmitted to the network on the uplink channel.

As a result, the present technology disclosed herein provides improved data transmission including downlink data transmission in uplink resource limited conditions.

Figure 1:
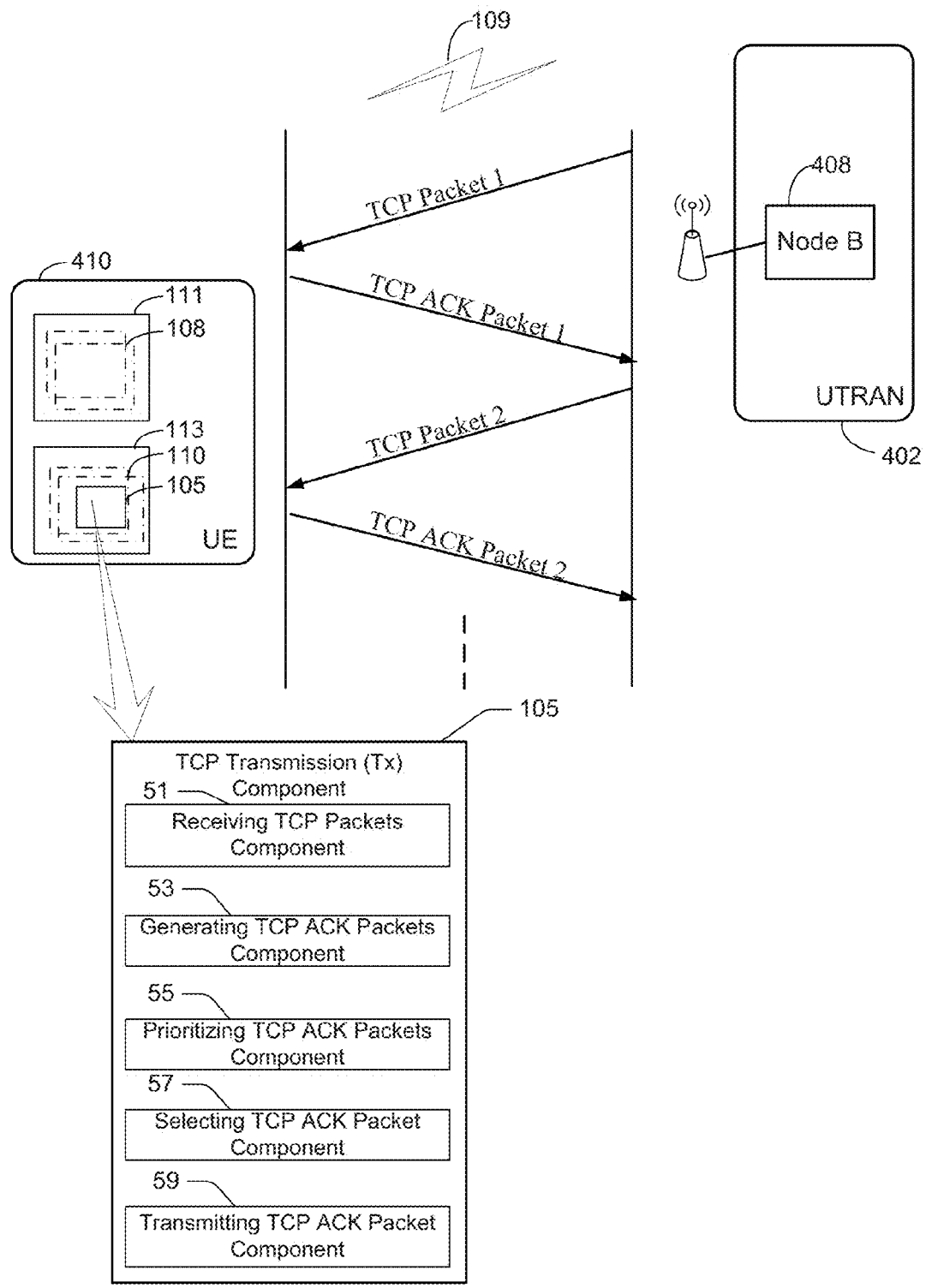
FIG. 1 is a diagram conceptually illustrating TCP communications between a user equipment and a network.

FIG. 1 is a diagram conceptually illustrating TCP communications between a UE 410 and a Node B 408 of a UMTS Terrestrial Radio Access Network (UTRAN) 402. As noted, TCP is the transport protocol commonly used to carry data traffic which needs reliability. TCP is a mechanism for reliable end-to-end data exchange and uses retransmission and flow control to provide the reliability. In the example shown in FIG. 1, the Node B 408 sends a TCP packet carrying certain information (e.g., TCP Packet 1) to the UE 410 over an air interface 109, via a downlink channel from the Node B 408 to the UE 410. In response to the received TCP packet (e.g., TCP Packet 1), the UE 410 prepares a TCP Acknowledgment (ACK) packet (e.g., TCP ACK Packet 1) and sends the TCP ACK packet to the Node B 408 over the air interface 109, via an uplink channel from the UE 410 to the Node B 408. Similarly, the Node B 408 sends another TCP packet (e.g., TCP Packet 2) to UE 410 and receives a corresponding acknowledgment from the UE 410 (e.g., TCP ACK Packet 2), and so on.

In wireless network environments, there can be a delay in uplink transmission of TCP ACK packets due to use of a certain proprietary transmission mechanism and limitations on the uplink channel. For example, the limitations on the uplink channel may include limited uplink grant from the network, allowed amounts of data or power, etc. Also, the frequency of TCP ACK packet transmission may be controlled by an operating system of the UE 410 or the network. That is, the UE 410 can be configured such that the UE 410 sends TCP ACK packets after receiving a certain number of TCP packets from the network, rather than every time the UE 410 receives a TCP packet from the network and sends an acknowledgment packet in response to the received TCP packet, as shown in FIG. 1. Thus, in one aspect of the present disclosure, upon receiving multiple TCP packets from the Node B 408, the UE 410 generates corresponding TCP ACK packets and prioritizes them before transmitting to the Node B 408, based on certain criteria, such as acknowledgement numbers or TCP flows associated with the TCP ACK packets, etc.

In one implementation, as shown in FIG. 1, the UE 410 for wireless communication includes means for or a component configured to implement various aspects of the present disclosure. In the example, the UE 410 includes a TCP transmission (Tx) component 105, which includes various means for or components configured to implement functions relating to TCP ACK transmission. By way of example, the TCP transmission component 105 includes a receiving TCP packets component 51, a generating TCP packets component 53, a prioritizing TCP packets component 55, a selecting TCP packet component 57, and a transmitting TCP packet component 59. The receiving TCP packets component 51 is means for or a component configured to receive a plurality of TCP packets on a downlink channel from a network. The generating TCP packets component 53 is means for or a component configured to generate a plurality of TCP ACK packets corresponding to the plurality of received TCP packets. The prioritizing TCP packets component 55 is means for or a component configured to prioritize the plurality of TCP ACK packets based on certain criteria for transmission on an uplink channel to the network. The prioritizing of the plurality of TCP ACK packets may be based on either acknowledgment numbers associated with the plurality of TCP ACK packets or TCP flows associated with the plurality of TCP ACK packets. The selecting TCP packet component 57 is means for or a component configured to determine a TCP ACK packet having a highest priority as the highest priority TCP ACK packet among the plurality of TCP ACK packets. The transmitting TCP packet component 59 is means for a component configured to transmit to the network the highest priority TCP ACK packet on the uplink channel.

In an aspect, the term "component" as used herein may be one of the parts that make up a system, may be hardware or software, and may be divided into other components.

In one aspect, the aforementioned means may be the processor(s) 504 (in FIG. 5) configured to perform the functions recited by the aforementioned means. In another aspect, the aforementioned means may be a module or any apparatus configured to perform the functions recited by the aforementioned means. In another aspect, the aforementioned means may be a combination of hardware and software components.

Further, in an aspect, the UE 410 may include an application processor 113 and a modem processor 111. The application processor 113 executes various software components 110 including a TCP software component. The modem processor 111 executes various software components 108 including modem software relating to receiving and transmitting data over the air. That is, a software component that produces the TCP ACK packets may be a distinct component from a software component that transmits the TCP ACK packets over the air. In the example, the TCP ACK packets are produced by the TCP software component (TCP software) on the application processor 113 of the UE 410. The TCP ACK packets are generated when data packets are received and according to a TCP stack algorithm. Also, TCP ACK packets for different data streams may be generated in parallel. By way of example, TCP ACK packets for JavaScript (JS) resource, Image resource, and HTML resource can be produced in parallel and then be forwarded to a modem software component of the UE for transmission to the air. The transmission of the TCP ACK packets to the air is done by the modem software running on the modem processor of the UE. The modem software has one single first in first out (FIFO) queue, which may be implemented as part of the modem software 108, for arriving packets of all kind, including TCP ACK packets, for transmission over the air to the network. FIFO is a traditional method of sending the packets to the air. So, in the example, if acknowledgment messages, e.g., ACK of Image and ACK of JS (which has a higher priority), are in the FIFO in some order, they will be sent in order and not according to their priority. That is, ACK of JS will not be sent before ACK of Image because of its higher priority. Further, all ACKs in the FIFO queue will be sent to the air, even if at the same time there are subsequent ACKs, in which later ACKs eliminate the need for earlier ones. The TCP software on the application processor may be aware of the priority of the data streams/packets that are currently handled, but this information (e.g., information on priority) may be lost on the way to the modem and when all parallel TCP streams arrive at a single queue at the modem.

In accordance with certain aspects of the present disclosure, the information on packet priority is propagated from the TCP stack software, and the modem is allowed to handle its FIFO queue in a more sophisticated way; that is, turn the FIFO queue into a priority queue and also choose which ACKs to send if multiple ACKs of the same stream are in the FIFO queue. Further, in an aspect, the modem software is aware of the modem state (e.g., whether the queue is full—the modem has a limited link) and this allows the modem to make smart decisions regarding the packets that are in the FIFO queue.

Figure 2:
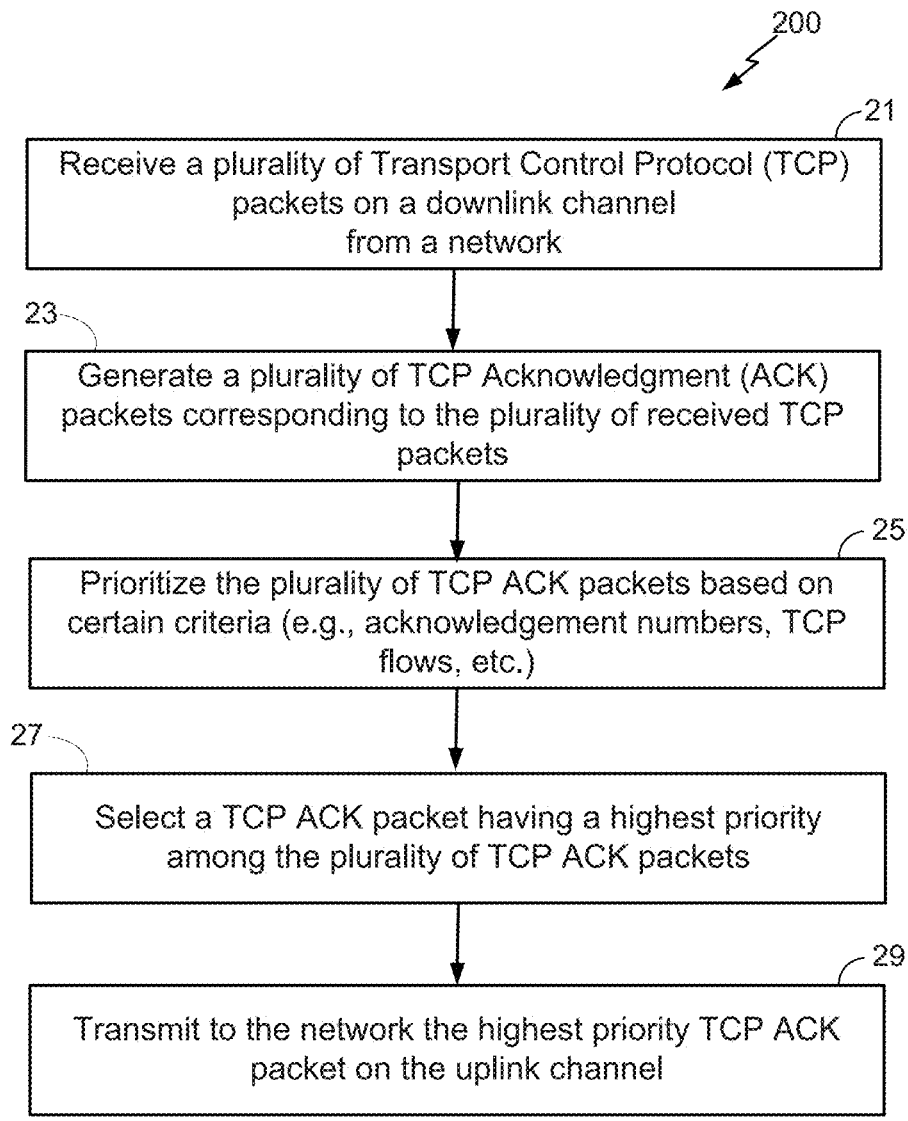
FIG. 2 is an example of a flowchart in accordance with an aspect of the present disclosure.

FIG. 2 is an example of a flowchart (e.g., 200) in accordance with an aspect of the present disclosure. At block 21, a plurality of TCP packets is received on a downlink channel from a network. For example, the receiving TCP packets component 51 of the UE 410 may receive the plurality of TCP packets on the downlink channel from the network.

At block 23, a plurality of TCP ACK packets are generated corresponding to the plurality of received TCP packets. For example, the generating TCP packets component 53 of the UE 410 may generate the plurality of TCP ACK packets each corresponding to each of the plurality of received TCP packets.

At block 25, the plurality of TCP ACK packets is prioritized based on certain criteria. For example, the prioritizing TCP component 55 of the UE 410 may prioritize the plurality of TCP ACK packets based on the certain criteria. The certain criteria may include acknowledgement numbers or TCP flows associated with the TCP ACK packets, type of service (TOS) information, etc.

At block 27, a TCP ACK packet with a highest priority is selected among the plurality of TCP ACK packets. For example, the selection TCP packet component 57 of the UE 410 may select the TCP ACK packet having the highest priority among the plurality of TCP ACK packets.

At block 29, the highest priority TCP ACK packet is transmitted on the uplink channel to the network. For example, the transmitting TCP component 59 sends to the network the selected highest priority TCP ACK packet on the uplink channel.

Figure 3A:
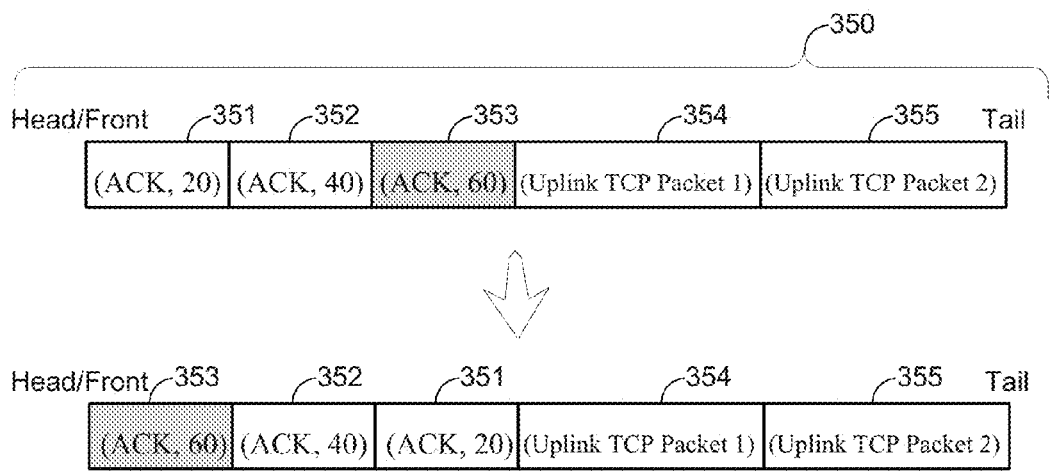
FIGS. 3A and 3B are diagrams conceptually illustrating a TCP transmission queue in the user equipment in accordance with an aspect of the present disclosure.
Figure 3B:
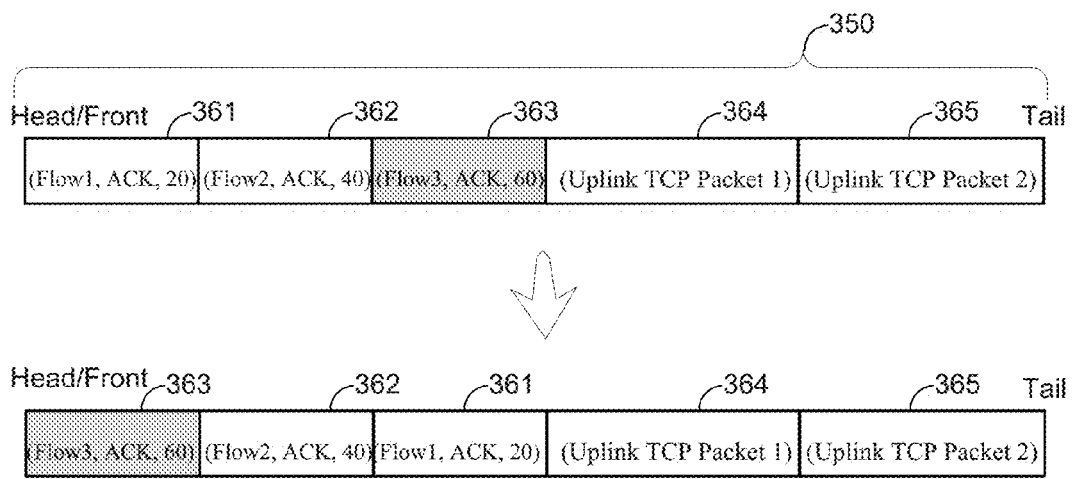

The above blocks 45 and 47 of FIG. 2 can be further illustrated by examples shown in FIGS. 3A and 3B. By way of example, FIGS. 3A and 3B show conceptual views of a TCP transmission queue 350 (e.g., the FIFO queue of the modem software 108) in the UE 410 for transmission of TCP data on an uplink channel to a network. In some aspects, the TCP transmission queue 350 may be part of the TCP transmission component 105 (FIG. 1).

As shown in FIG. 3A, in the TCP transmission queue 350 packets are queued in sequence for uplink transmission. For example, TCP ACK packets are queued in order, e.g., (ACK, 20) 351, (ACK, 40) 362, and (ACK, 60) 353, followed by two uplink TCP packets 354 and 355. Here, (ACK, 20) means a TCP ACK packet with an acknowledgement number 20; (ACK, 40) means a TCP ACK packet with an acknowledgement number 40; and (ACK, 60) means a TCP ACK packet with an acknowledgement number 60. The acknowledgement number is defined herein as the next sequence number of a TCP packet the UE 410 is expecting to receive from the network, which also acknowledges receipt by the UE 410 of all prior TCP packets. Thus, (ACK, 60) is a TCP ACK packet acknowledging that the UE 410 has received all the prior packets up to the one having a sequence number 59. In the example, in response to three TCP packets being received from the network, the UE 410 has generated corresponding three TCP ACK packets, which are placed in the TCP transmission queue 350 along with other uplink packets.

As noted earlier, in an aspect of the present disclosure, prior to transmitting the TCP ACK packets on the uplink channel, the TCP ACK packets are prioritized based on certain criteria. By way of example, as shown in FIG. 3A, the TCP ACK packets may be prioritized based on the acknowledgement numbers associated with the TCP ACK packets. That is, the TCP ACK packets 351, 352, and 353 are prioritized based on their acknowledgement numbers 20, 40, and 60, respectively. After the prioritization, the TCP ACK packet having a highest acknowledgement number, e.g., (ACK, 60) 353 is selected as the highest priority TCP ACK packet for uplink transmission among the three TCP ACK packets (e.g., (ACK, 20), (ACK, 40), and (ACK, 60)) and is placed in the front of the TCP transmission queue 350 for uplink transmission (e.g., reorder and placed in front of the other remaining TCP ACK packets). The highest priority TCP ACK packet, (ACK, 60) 353 is then transmitted to the network prior to transmission of the other TCP ACK packets (ACK, 40) 352 and (ACK, 20) 351. That is, the TCP ACK packets in the TCP transmission queue are ordered based on the acknowledgement numbers associated with the TCP ACK packets and then the ordered TCP ACK packets are transmitted on the uplink channel (e.g., the latest acknowledgement first, the second latest acknowledgement next, and so on). In one aspect, after transmitting the highest priority TCP ACK packet (ACK, 60) 363, the UE 410 may not transmit to the network the other remaining TCP ACK packets (ACK, 20) 351 and (ACK, 40) 352.

Alternatively, as shown in FIG. 3B, TCP ACK packets can be prioritized based on priority or significance of TCP flows associated with the TCP ACK packets. FIG. 3B shows the TCP transmission queue 350 in the UE 410 containing multiple TCP ACK packets associated with different TCP flows.

Generally, in TCP data transfer, TCP packets may be associated with different TCP flows, based on different applications or port connections to a device on a network. By way of example, for downloading a news web page from a news server on the network, the UE 410 may establish multiple TCP connections to the news server on the network. For example, a specific news web page may contain news content, an advertisement and a video. To speed up downloading of the news web page, the UE 410 may open and establish three parallel, but different TCP connections to the news server on the network for downloading the content, e.g., establish TCP flow 1 for the video content, TCP flow 2 for the advertisement content, and TCP flow 3 for the news content. Here, it is assumed that downloading the news content has the highest priority over downloading other materials, such as advertisements or videos. That is, the priority order of TCP flows for this example will be TCP flow 3>TCP flow 1> and TCP flow 2 such that TCP flow 3 is the highest priority TCP flow among the three TCP flows.

Referring to FIG. 3B and the example above, in response to received TCP packets from the news server on the network, the UE 410 generates TCP ACK packets corresponding to the received TCP packets, (Flow 1, ACK, 20) 361, (Flow 2, ACK, 40) 362, and (Flow 3, ACK, 60) 363. As shown in FIG. 3B, the UE 410 may store the TCP ACK packets and other uplink packets in the TCP transmission queue 350 for uplink transmission. In an aspect of the present disclosure, the TCP packets are queued in the TCP transmission queue 350 in sequence as follows: (Flow 1, ACK, 20) 361, (Flow 2, ACK, 40) 362, and (Flow 3, ACK, 60) 363, (Uplink TCP packet) 364, and (Uplink TCP packet 2) 365. In the aspect of the present disclosure, the TCP ACK packets are then prioritized based on TCP flows associated with the TCP ACK packets in the TCP transmission queue 350. That is, TCP flows of the TCP ACK packets (Flow 1, ACK, 20) 361, (Flow 2, ACK, 40) 362, and (Flow 3, ACK, 60) 363 are examined and a TCP ACK packet having a highest priority TCP flow is selected as the highest priority TCP ACK packet for the uplink transmission by the UE 410. That is, in the example above, (Flow 3, ACK, 60) 363 is selected as the highest priority TCP ACK packet in the TCP transmission queue 350 since the priority of TCP flow of (Flow 3, ACK, 60) is the highest among the three TCP ACK packets. As a result, the TCP ACK packet (Flow 3, ACK, 60) 363 is placed in front of the TCP transmission queue 350 and transmitted to the news server on the network prior to transmission of the other TCP ACK packets.

In an aspect, the TCP ACK packets in the TCP transmission queue 350 are transmitted based on the priority order of the TCP flows associated with the TCP ACK packets (e.g., the highest priority TCP ACK first, the next highest priority TCP ACK second, and so on). In another aspect, after transmission of the highest priority TCP ACK packet, the UE 410 may not transmit the remaining TCP ACK packets (Flow 1, ACK, 20) 361 and (Flow 2, ACK, 40) 362.

In another aspect, the TCP ACK packets may not re-ordered and sent out when the TCP ACK packets belong to the same TCP flow. That is, if (ACK, 20) is already sent, (ACK, 10) that belongs to the same TCP flow will not be sent.

In another aspect of the present disclosure, different TCP flows may be identified based on port address included in TCP packets and priorities can be identified based on type of service (TOS) parameters in an Internet Protocol (IP) packet which is associated with the TCP packets.

In another aspect of the present disclosure, two or more TCP ACK packets that belong to new TCP flows or to lowly prioritized TCP flows are prioritized, which the two or more TCP ACK packets are not released for some time. This helps eliminating TCP flow starvation.

Alternatively, the TCP ACK packets can be prioritized based at least on both acknowledgement number and priority (or significance) of TCP flows (e.g., prioritize the TCP ACK packets based on flows and then acknowledgement number within the flow).

As a result, through the present technology, transmission of the highest priority or data of highest importance on the downlink channel can be realized without much delay. Further, by sending the latest TCP ACK on a given TCP flow at any point of time from outstanding TCP ACK packets in a transmission queue of the UE 410, several advantages may be obtained. First, if the uplink channel is resource limited (e.g., grant, power, access to a channel, etc.) as the UE 410 sends the latest TCP ACK or the highest priority TCP ACK, which helps the window management, the present technology quickly results in improved downlink data transmission. Second, if the uplink channel is not resource limited, the present technology will improve the downlink data transmission when considered as one of the input for the window management.

Figure 4:
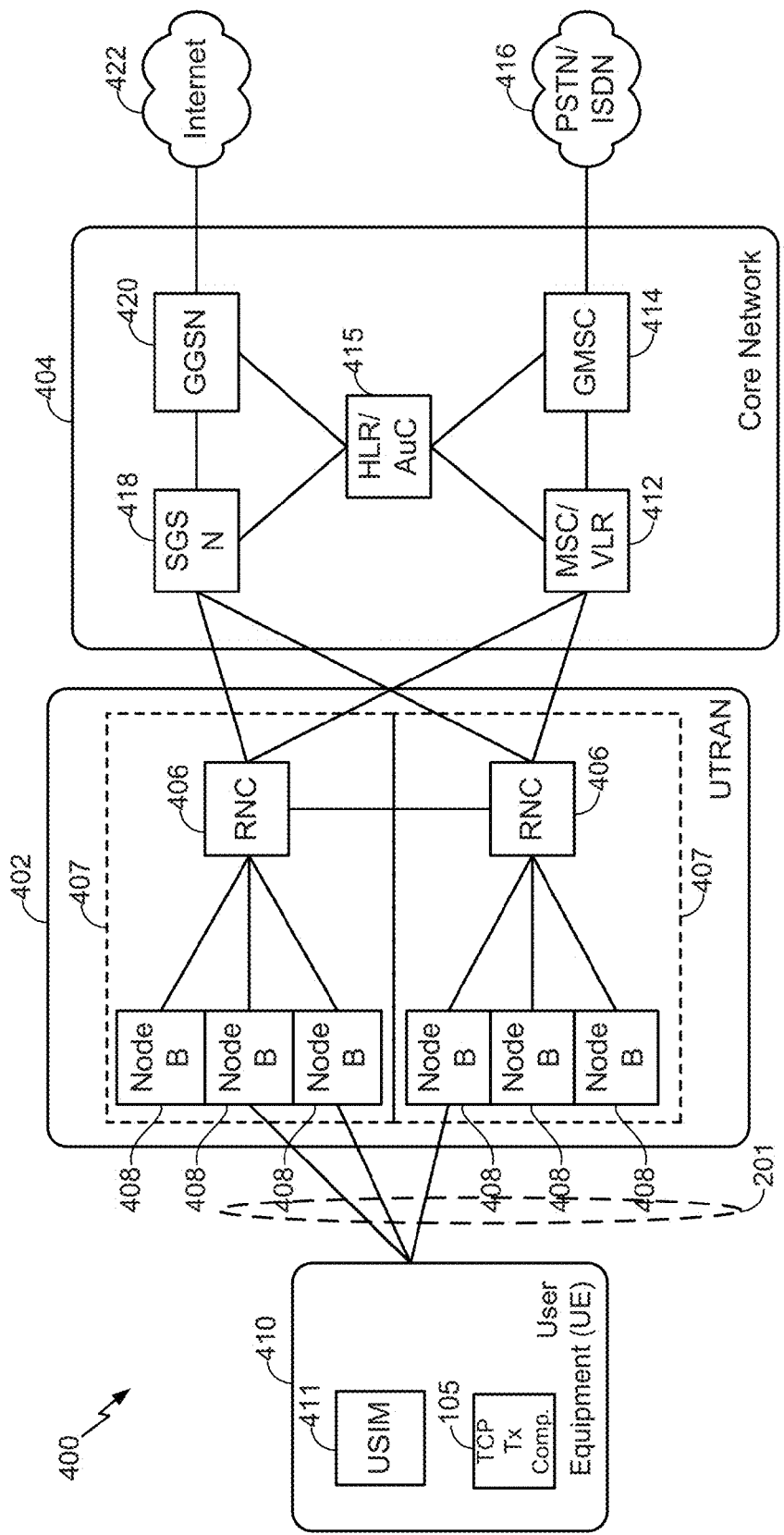
FIG. 4 is a block diagram conceptually illustrating an example of a telecommunications system.

The various concepts presented throughout this disclosure may be implemented across a broad variety of telecommunication systems, network architectures, and communication standards. By way of example and without limitation, the aspects of the present disclosure illustrated in FIG. 4 are presented with reference to a UMTS system 400 employing a W-CDMA air interface. A UMTS network includes three interacting domains: a Core Network (CN) 404, a UMTS Terrestrial Radio Access Network (UTRAN) 402, and UE 410. In this example, the UTRAN 402 provides various wireless services including telephony, video, data, messaging, broadcasts, and/or other services. The UTRAN 402 may include a plurality of Radio Network Subsystems (RNSs) such as an RNS 407, each controlled by a respective Radio Network Controller (RNC) such as an RNC 406. Here, the UTRAN 402 may include any number of RNCs 406 and RNSs 407 in addition to the RNCs 406 and RNSs 407 illustrated herein. The RNC 406 is an apparatus responsible for, among other things, assigning, reconfiguring and releasing radio resources within the RNS 407. The RNC 406 may be interconnected to other RNCs (not shown) in the UTRAN 402 through various types of interfaces such as a direct physical connection, a virtual network, or the like, using any suitable transport network.

Communication between a UE 410 and a Node B 408 may be considered as including a physical (PHY) layer and a medium access control (MAC) layer. Further, communication between a UE 410 and an RNC 406 by way of a respective Node B 408 may be considered as including a radio resource control (RRC) layer. In the instant specification, the PHY layer may be considered layer 1; the MAC layer may be considered layer 2; and the RRC layer may be considered layer 3. Information herein below utilizes terminology introduced in the RRC Protocol Specification, 3GPP TS 25.331 v9.1.0, incorporated herein by reference.

The geographic region covered by the RNS 407 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 408 are shown in each RNS 407; however, the RNSs 407 may include any number of wireless Node Bs. The Node Bs 408 provide wireless access points to a CN 404 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 410 may further include a universal subscriber identity module (USIM) 411, which contains a user's subscription information to a network, and the TCP transmission component (TCP Tx Comp.) 105 that may implement various aspects of the present disclosure. For illustrative purposes, one UE 410 is shown in communication with a number of the Node Bs 408. The DL (a downlink channel), also called the forward link, refers to the communication link from a Node B 408 to a UE 410, and the UL (an uplink channel), also called the reverse link, refers to the communication link from a UE 410 to a Node B 408.

The CN 404 interfaces with one or more access networks, such as the UTRAN 402. As shown, the CN 404 is a GSM core network. However, as those skilled in the art will recognize, the various concepts presented throughout this disclosure may be implemented in a RAN, or other suitable access network, to provide UEs with access to types of CNs other than GSM networks.

The CN 404 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 404 supports circuit-switched services with a MSC 412 and a GMSC 414. In some applications, the GMSC 414 may be referred to as a media gateway (MGW). One or more RNCs, such as the RNC 406, may be connected to the MSC 412. The MSC 412 is an apparatus that controls call setup, call routing, and UE mobility functions. The MSC 412 also includes a VLR that contains subscriber-related information for the duration that a UE is in the coverage area of the MSC 412. The GMSC 414 provides a gateway through the MSC 412 for the UE to access a circuit-switched network 416. The GMSC 414 includes a home location register (HLR) 415 containing subscriber data, such as the data reflecting the details of the services to which a particular user has subscribed. The HLR is also associated with an authentication center (AuC) that contains subscriber-specific authentication data. When a call is received for a particular UE, the GMSC 414 queries the HLR 415 to determine the UE's location and forwards the call to the particular MSC serving that location.

The CN 404 also supports packet-data services with a serving GPRS support node (SGSN) 418 and a gateway GPRS support node (GGSN) 420. GPRS, which stands for General Packet Radio Service, is designed to provide packet-data services at speeds higher than those available with standard circuit-switched data services. The GGSN 420 provides a connection for the UTRAN 402 to a packet-based network 422. The packet-based network 422 may be the Internet, a private data network, or some other suitable packet-based network. The primary function of the GGSN 420 is to provide the UEs 410 with packet-based network connectivity. Data packets may be transferred between the GGSN 420 and the UEs 410 through the SGSN 418, which performs primarily the same functions in the packet-based domain as the MSC 412 performs in the circuit-switched domain.

An air interface 401 for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 408 and a UE 410. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 410 provides feedback to the node B 408 over the HS-DPCCH to indicate whether it correctly decoded a packet on the downlink.

HS-DPCCH further includes feedback signaling from the UE 410 to assist the node B 408 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the node B 408 and/or the UE 410 may have multiple antennas supporting MIMO technology. The use of MIMO technology enables the node B 408 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multi-path fading and increase transmission quality, and spatial multiplexing gains to increase data throughput.

Spatial multiplexing may be used to transmit different streams of data simultaneously on the same frequency. The data steams may be transmitted to a single UE 410 to increase the data rate or to multiple UEs 410 to increase the overall system capacity. This is achieved by spatially precoding each data stream and then transmitting each spatially precoded stream through a different transmit antenna on the downlink. The spatially precoded data streams arrive at the UE(s) 410 with different spatial signatures, which enables each of the UE(s) 410 to recover the one or more the data streams destined for that UE 410. On the uplink, each UE 410 may transmit one or more spatially precoded data streams, which enables the node B 408 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 5:
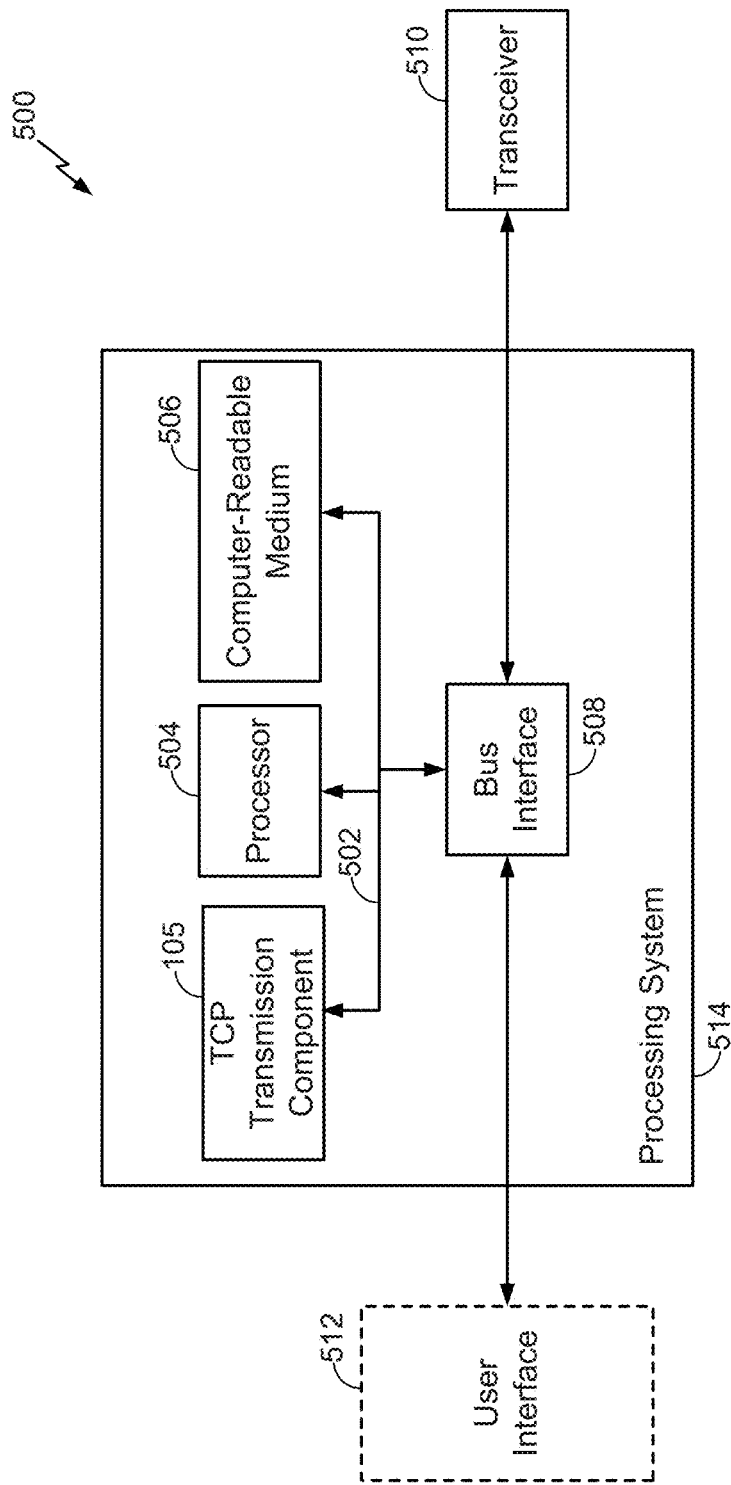
FIG. 5 is a block diagram conceptually illustrating an apparatus for wireless communication in accordance with the present disclosure.

FIG. 5 is a block diagram conceptually illustrating an example of a hardware implementation for an apparatus 500 employing a processing system 514. The apparatus 500 can be any communications device including a UE. In this example, the processing system 514 may be implemented with a bus architecture, represented generally by the bus 502. The bus 502 may include any number of interconnecting buses and bridges depending on the specific application of the processing system 514 and the overall design constraints. The bus 502 links together various circuits including one or more processors, represented generally by the processor 504, and computer-readable media, represented generally by the computer-readable medium 506, and one or more TCP transmission components, represented generally by the TCP transmission component 105. The bus 502 may also link various other circuits such as timing sources, peripherals, voltage regulators, and power management circuits, which are well known in the art, and therefore, will not be described any further. A bus interface 508 provides an interface between the bus 502 and a transceiver 510. The transceiver 510 provides a means for communicating with various other apparatus over a transmission medium. Depending upon the nature of the apparatus, a user interface 512 (e.g., keypad, display, speaker, microphone, joystick) may also be provided.

The processor 504 is responsible for managing the bus 502 and general processing, including the execution of software stored on the computer-readable medium 506. The software, when executed by the processor 504, causes the processing system 514 to perform the various functions described herein for any particular apparatus. The computer-readable medium 506 may also be used for storing data that is manipulated by the processor 504 when executing software. Further, various aspects of the presently disclosed technology can be performed by the processor 504, computer-readable medium 506, TCP transmission component 105, or any combination thereof.

Figure 6:
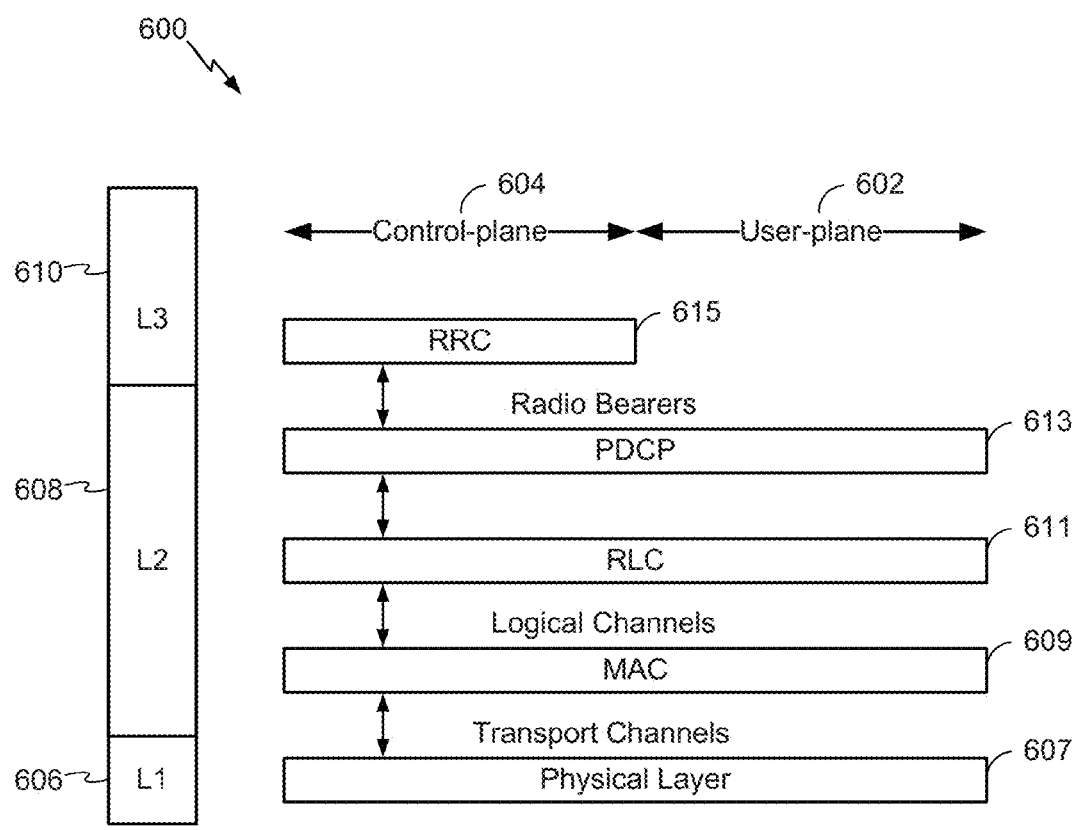
FIG. 6 is a diagram conceptually illustrating an example of a radio protocol architecture relating to a user plane and control plane.

FIG. 6 is an example diagram conceptually illustrating a radio protocol architecture 600 relating to the user plane 602 and the control plane 604 of a UE or node B/base station. For example, the radio protocol architecture 600 may be included in a UE such as the UE 410 (FIG. 1) having the TCP transmission component 105. The radio protocol architecture 600 for the UE and node B is shown with three layers: Layer 1 606, Layer 2 608, and Layer 3 610. Layer 1 606 is the lowest layer and implements various physical layer signal processing functions. As such, Layer 1 606 includes the physical layer 607. Layer 2 (L2 layer) 608 is above the physical layer 607 and is responsible for the link between the UE and node B over the physical layer 607. Layer 3 (L3 layer) 610 includes a radio resource control (RRC) sublayer 615. The RRC sublayer 615 handles the control plane signaling of Layer 3 between the UE and the UTRAN.

In the user plane, the L2 layer 608 includes a media access control (MAC) sublayer 609, a radio link control (RLC) sublayer 611, and a packet data convergence protocol (PDCP) 613 sublayer, which are terminated at the node B on the network side. Although not shown, the UE may have several upper layers above the L2 layer 608 including a network layer (e.g., IP layer) that is terminated at a PDN gateway on the network side, and an application layer that is terminated at the other end of the connection (e.g., far end UE, server, etc.).

The PDCP sublayer 613 provides multiplexing between different radio bearers and logical channels. The PDCP sublayer 613 also provides header compression for upper layer data packets to reduce radio transmission overhead, security by ciphering the data packets, and handover support for UEs between node Bs. The RLC sublayer 611 provides segmentation and reassembly of upper layer data packets, retransmission of lost data packets, and reordering of data packets to compensate for out-of-order reception due to hybrid automatic repeat request (HARQ). The MAC sublayer 609 provides multiplexing between logical and transport channels. The MAC sublayer 609 is also responsible for allocating the various radio resources (e.g., resource blocks) in one cell among the UEs. The MAC sublayer 609 is also responsible for HARQ operations.

Figure 7:
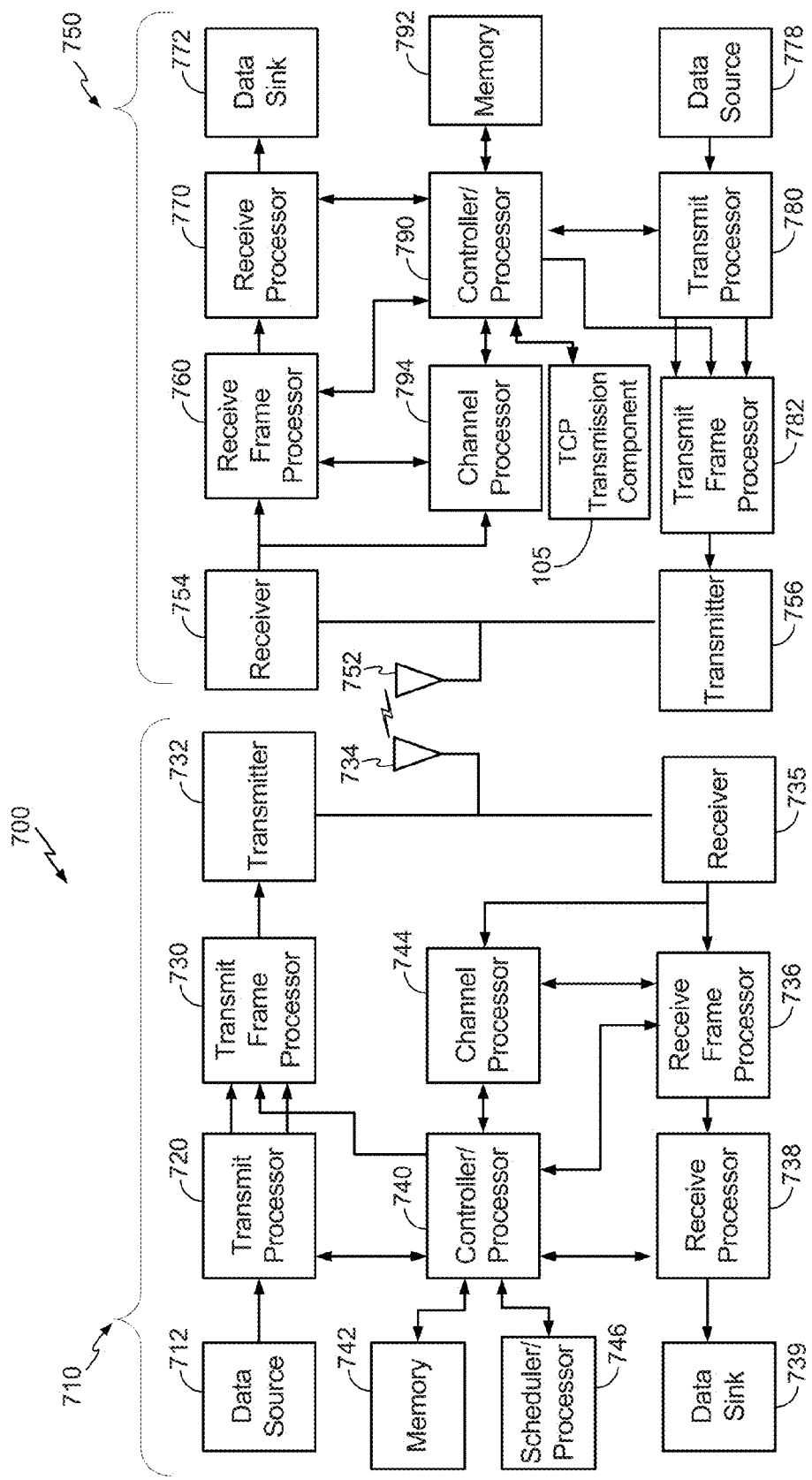
FIG. 7 is a block diagram conceptually illustrating an example of a Node B in communication with a UE in a telecommunications system.

FIG. 7 is a block diagram of a Node B 710 in communication with a UE 750, where the Node B 710 may be an example of the Node B 408 in FIG. 1, and the UE 750 may be an example of the UE 410 in FIG. 1 having the TCP transmission component 105. In the downlink communication, a transmit processor 720 may receive data from a data source 712 and control signals from a controller/processor 740. The transmit processor 720 provides various signal processing functions for the data and control signals, as well as reference signals (e.g., pilot signals). For example, the transmit processor 720 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 744 may be used by a controller/processor 740 to determine the coding, modulation, spreading, and/or scrambling schemes for the transmit processor 720. These channel estimates may be derived from a reference signal transmitted by the UE 750 or from feedback from the UE 750. The symbols generated by the transmit processor 720 are provided to a transmit frame processor 730 to create a frame structure. The transmit frame processor 730 creates this frame structure by multiplexing the symbols with information from the controller/processor 740, resulting in a series of frames. The frames are then provided to a transmitter 732, which provides various signal conditioning functions including amplifying, filtering, and modulating the frames onto a carrier for downlink transmission over the wireless medium through antenna 734. The antenna 734 may include one or more antennas, for example, including beam steering bidirectional adaptive antenna arrays or other similar beam technologies.

At the UE 750, a receiver 754 receives the downlink transmission through an antenna 752 and processes the transmission to recover the information modulated onto the carrier. The information recovered by the receiver 754 is provided to a receive frame processor 760, which parses each frame, and provides information from the frames to a channel processor 794 and the data, control, and reference signals to a receive processor 770. The receive processor 770 then performs the inverse of the processing performed by the transmit processor 720 in the Node B 710. More specifically, the receive processor 770 descrambles and despreads the symbols, and then determines the most likely signal constellation points transmitted by the Node B 710 based on the modulation scheme. These soft decisions may be based on channel estimates computed by the channel processor 794. The soft decisions are then decoded and deinterleaved to recover the data, control, and reference signals. The CRC codes are then checked to determine whether the frames were successfully decoded. The data carried by the successfully decoded frames will then be provided to a data sink 772, which represents applications running in the UE 750 and/or various user interfaces (e.g., display). Control signals carried by successfully decoded frames will be provided to a controller/processor 790. When frames are unsuccessfully decoded by the receiver processor 770, the controller/processor 790 may also use an acknowledgement (ACK) and/or negative acknowledgement (NACK) protocol to support retransmission requests for those frames. Further, the TCP transmission component 105 in the UE 750 is configured to perform various functions described herein relating to transmission of TCP ACK packets.

In the uplink, data from a data source 778 and control signals from the controller/processor 790 are provided to a transmit processor 780. The data source 778 may represent applications running in the UE 750 and various user interfaces (e.g., keyboard). Similar to the functionality described in connection with the downlink transmission by the Node B 710, the transmit processor 880 provides various signal processing functions including CRC codes, coding and interleaving to facilitate FEC, mapping to signal constellations, spreading with OVSFs, and scrambling to produce a series of symbols. Channel estimates, derived by the channel processor 794 from a reference signal transmitted by the Node B 710 or from feedback contained in the midamble transmitted by the Node B 710, may be used to select the appropriate coding, modulation, spreading, and/or scrambling schemes. The symbols produced by the transmit processor 780 will be provided to a transmit frame processor 782 to create a frame structure. The transmit frame processor 782 creates this frame structure by multiplexing the symbols with information from the controller/processor 790, resulting in a series of frames. The frames are then provided to a transmitter 756, which provides various signal conditioning functions including amplification, filtering, and modulating the frames onto a carrier for uplink transmission over the wireless medium through the antenna 752.

The uplink transmission is processed at the Node B 710 in a manner similar to that described in connection with the receiver function at the UE 750. A receiver 735 receives the uplink transmission through the antenna 734 and processes the transmission to recover the information modulated onto the carrier. The information recovered by the receiver 735 is provided to a receive frame processor 736, which parses each frame, and provides information from the frames to the channel processor 744 and the data, control, and reference signals to a receive processor 738. The receive processor 738 performs the inverse of the processing performed by the transmit processor 780 in the UE 750. The data and control signals carried by the successfully decoded frames may then be provided to a data sink 739 and the controller/processor, respectively. If some of the frames were unsuccessfully decoded by the receive processor, the controller/processor 740 may also use an acknowledgement (ACK) and/or negative acknowledgement (NACK) protocol to support retransmission requests for those frames.

The controller/processors 740 and 790 may be used to direct the operation at the Node B 710 and the UE 750, respectively. For example, the controller/processors 740 and 790 may provide various functions including timing, peripheral interfaces, voltage regulation, power management, TCP transmission control, and other control functions. The computer readable media of memories 742 and 792 may store data and software for the Node B 710 and the UE 750, respectively. A scheduler/processor 746 at the Node B 710 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a, b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, or 35 U.S.C. §112(f), unless the element is expressly recited using the phrase "means for" or, in the case of a method claim, the element is recited using the phrase "step for."

What is claimed is:

1. A method of wireless communications for a user equipment (UE), comprising:
receiving a plurality of Transmission Control Protocol (TCP) packets on a downlink channel from a network;
generating a plurality of TCP Acknowledgment (ACK) packets each corresponding to each of the plurality of received TCP packets;
prioritizing the plurality of TCP ACK packets for transmission on an uplink channel based on either acknowledgment numbers associated with the plurality of TCP ACK packets or TCP flows associated with the plurality of TCP ACK packets, the acknowledgement numbers corresponding to a next sequence number of each of the plurality of TCP ACP packets expected to be received on the uplink channel and acknowledging receipt by the UE of all prior TCP ACK packets, the TCP flows being identified based on at least one of a plurality of applications operating on the UE or a plurality of port connections on the uplink channel to the network, and wherein prioritizing the plurality of TCP ACK packets for transmission on the uplink channel based on the acknowledgement numbers associated with the plurality of TCP ACK packets includes prioritizing a TCP ACK packet of the plurality of TCP ACK packets with the highest acknowledgement number as a highest priority TCP ACK packet for transmission on the uplink channel;

selecting a TCP ACK packet having a highest priority among the plurality of TCP ACK packets; and transmitting to the network a first transmission of the selected highest priority TCP ACK packet on the uplink channel.

2. The method of claim 1, wherein selecting a TCP ACK packet having a highest priority among the plurality of TCP ACK packets comprises selecting a TCP ACK packet having a highest acknowledgment number among the plurality of TCP ACK packets.

3. The method of claim 1, wherein selecting a TCP ACK packet having a highest priority among the plurality of TCP ACK packets comprises selecting a TCP ACK packet having a highest priority TCP flow among the plurality of TCP ACK packets.

4. The method of claim 3, wherein a TCP flow associated with one or more TCP ACK packets is identified based at least in part on destination port information of respective TCP ACK packets.

5. The method of claim 1, wherein at least one resource of the uplink channel is limited, and the at least one resource includes at least one of a grant, a transmit power, an access to a channel, or an allowed transport format.

6. The method of claim 1, wherein the prioritizing of the plurality of TCP ACK packets is further based at least in part on type of service (TOS) information.

7. The method of claim 1, wherein the prioritizing of the plurality of TCP ACK packets further comprises prioritizing two or more TCP ACK packets that belong to new TCP flows or to lowly prioritized TCP flows, the two or more TCP ACK packets being not released for some time.

8. The method of claim 1, wherein the prioritizing of the plurality of TCP ACK packets further comprises:

prioritizing the TCP ACK packets based on the TCP flows; and prioritizing the TCP ACK packets based on the acknowledgement numbers within the TCP flows.

9. An apparatus for wireless communications, comprising:

means for receiving a plurality of Transmission Control Protocol (TCP) packets on a downlink channel from a network;

means for generating a plurality of TCP Acknowledgment (ACK) packets corresponding to the plurality of received TCP packets;

means for prioritizing the plurality of TCP ACK packets for transmission on an uplink channel based on either acknowledgment numbers associated with the plurality of TCP ACK packets or TCP flows associated with the plurality of TCP ACK packets, the acknowledgement numbers corresponding to a next sequence number of each of the plurality of TCP ACP packets expected to be received on the uplink channel and acknowledging receipt by the UE of all prior TCP ACK packets, the TCP flows being identified based on at least one of a plurality of applications operating on the UE or a plurality of port connections on the uplink channel to the network, and wherein the means for prioritizing the plurality of TCP ACK packets for transmission on the uplink channel based on the acknowledgement numbers associated with the plurality of TCP ACK packets includes means for prioritizing a TCP ACK packet of the plurality of TCP ACK packets with the highest acknowledgement number as a highest priority TCP ACK packet for transmission on the uplink channel;

means for selecting a TCP ACK packet having a highest priority among the plurality of TCP ACK packets; and means for transmitting to the network a first transmission of the selected highest priority TCP ACK packet on the uplink channel.

10. The apparatus of claim 9, wherein the means for the TCP ACK packet having the highest priority comprises means for selecting a TCP ACK packet having a highest acknowledgment number among the plurality of TCP ACK packets.

11. The apparatus of claim 9, wherein the means for selecting the TCP ACK packet having the highest priority comprises means for selecting a TCP ACK packet having a highest priority TCP flow among the plurality of TCP ACK packets.

12. The apparatus of claim 11, wherein a TCP flow associated with one or more TCP ACK packets is identified based at least in part on destination port information of respective TCP ACK packets.

13. The apparatus of claim 9, wherein at least one resource of the uplink channel is limited, and the at least one resource includes at least one of a grant, a transmit power, an access to a channel, or an allowed transport format.

14. The apparatus of claim 9, wherein the prioritizing of the plurality of TCP ACK packets is further based at least in part on type of service (TOS) information.

15. The apparatus of claim 9, wherein the means for prioritizing the plurality of TCP ACK packets further comprises means for prioritizing two or more TCP ACK packets that belong to new TCP flows or to lowly prioritized TCP flows, the two or more TCP ACK packets being not released for some time.

16. The apparatus of claim 9, wherein the means for prioritizing the plurality of TCP ACK packets further comprises:

means for prioritizing the TCP ACK packets based on the TCP flows; and means for prioritizing the TCP ACK packets based on the acknowledgement numbers within the TCP flows.

17. A Transmission Control Protocol (TCP) transmission component of a user equipment (UE) for wireless communication, the TCP transmission component comprising:

a receiving TCP packets component configured to receive a plurality of TCP packets on a downlink channel from a network;

a generating TCP packets component configured to generate a plurality of TCP ACK packets corresponding to the plurality of received TCP packets;

a prioritizing TCP packets component configured to prioritize the plurality of TCP ACK packets for transmission on an uplink channel based on either acknowledgment numbers associated with the plurality of TCP ACK packets or TCP flows associated with the plurality of TCP ACK packets, the acknowledgement numbers corresponding to a next sequence number of each of the plurality of TCP ACP packets expected to be received on the uplink channel and acknowledging receipt by the UE of all prior TCP ACK packets, the TCP flows being identified based on at least one of a plurality of applications operating on the UE or a plurality of port connections on the uplink channel to the network, and wherein the prioritizing TCP ACK packets component configured to prioritize the plurality of TCP ACK packets for transmission on the uplink channel based on the acknowledgement numbers associated with the plurality of TCP ACK packets is further configured to prioritize a TCP ACK packet of the plurality of TCP ACK packets with the highest acknowledgement number as a highest priority TCP ACK packet for transmission on the uplink channel;

a selecting TCP packet component configured to select a TCP ACK packet having a highest priority among the plurality of TCP ACK packets; and a transmitting TCP packet component configured to transmit to the network a first transmission of the highest priority TCP ACK packet on the uplink channel.

18. The TCP transmission component of claim 17, wherein the selecting TCP packet component is further configured to select a TCP ACK packet having a highest acknowledgment number among the plurality of TCP ACK packets.

19. The TCP transmission component of claim 17, wherein the selecting TCP packet component is further configured to select a TCP ACK packet having a highest priority TCP flow among the plurality of TCP ACK packets.

20. The TCP transmission component of claim 19, wherein a TCP flow associated with one or more TCP ACK packets is identified based at least in part on destination port information of respective TCP ACK packets.

21. The TCP transmission component of claim 17, wherein at least one resource of the uplink channel is limited, and wherein the at least one resource includes at least one of a grant, a transmit power, an access to a channel, or an allowed transport format.

22. The TCP transmission component of claim 17, wherein the prioritizing TCP packet component is further configured to prioritize the plurality of TCP ACK packets based at least in part on type of service (TOS) information.

23. A computer readable medium storing computer executable code for wireless communications of a user equipment (UE), comprising:
 code for receiving a plurality of Transmission Control Protocol (TCP) packets on a downlink channel from a network;
 code for generating a plurality of TCP Acknowledgment (ACK) packets each corresponding to each of the plurality of received TCP packets;
 code for prioritizing the plurality of TCP ACK packets for transmission on an uplink channel based on either acknowledgment numbers associated with the plurality of TCP ACK packets or TCP flows associated with the plurality of TCP ACK packets, the acknowledgement numbers corresponding to a next sequence number of each of the plurality of TCP ACP packets expected to be received on the uplink channel and acknowledgement receipt by the UE of all prior TCP ACK packets, the TCP flows being identified based on at least one of a plurality of applications operating on the UE or a plurality of port connections on the uplink channel to the network, and wherein the code for prioritizing the plurality of TCP ACK packets for transmission on the uplink channel based on the acknowledgement numbers associated with the plurality of TCP ACK packets includes code for prioritizing a TCP ACK packet of the plurality of TCP ACK packets with the highest acknowledgement number as a highest priority TCP ACK packet for transmission on the uplink channel;
 code for selecting a TCP ACK packet having a highest priority among the plurality of TCP ACK packets; and
 code for transmitting to the network a first transmission of the selected highest priority TCP ACK packet on the uplink channel.

24. The computer readable medium of claim 23, wherein code for selecting a TCP ACK packet having a highest priority among the plurality of TCP ACK packets comprises code for selecting a TCP ACK packet having a highest acknowledgment number among the plurality of TCP ACK packets.

25. The computer readable medium of claim 24, wherein code for selecting a TCP ACK packet having a highest priority among the plurality of TCP ACK packets comprises code for selecting a TCP ACK packet having a highest priority TCP flow among the plurality of TCP ACK packets.

26. The computer readable medium of claim 25, wherein a TCP flow associated with one or more TCP ACK packets is identified based at least in part on destination port information of respective TCP ACK packets.

27. The computer readable medium of claim 23, wherein at least one resource of the uplink channel is limited, and the at least one resource includes at least one of a grant, a transmit power, an access to a channel, or an allowed transport format.

28. The computer readable medium of claim 23, wherein the prioritizing of the plurality of TCP ACK packets is further based at least in part on type of service (TOS) information.

29. The computer readable medium of claim 23, wherein code for prioritizing the plurality of TCP ACK packets further comprises code for prioritizing two or more TCP ACK packets that belong to new TCP flows or to lowly prioritized TCP flows, the two or more TCP ACK packets being not released for some time.

30. The computer readable medium of claim 23, wherein code for prioritizing the plurality of TCP ACK packets further comprises:
 code for prioritizing the TCP ACK packets based on the TCP flows; and
 code for prioritizing the TCP ACK packets based on the acknowledgement numbers within the TCP flows.

* * * * *